US010137870B2

(12) United States Patent
Decker, Jr. et al.

(10) Patent No.: US 10,137,870 B2
(45) Date of Patent: Nov. 27, 2018

(54) BRAKE LOCK DETECTION SYSTEM FOR TOWED VEHICLES

(71) Applicant: Danko Manufacturing LLC, Castle Rock, CO (US)

(72) Inventors: Daniel L. Decker, Jr., Castle Rock, CO (US); Jerad M. Burkhart, Castle Rock, CO (US); Ronald E. Decker, Sedalia, CO (US); Samuel T. Shumate, Castle Rock, CO (US); Eric K. Becker, Sedalia, CO (US); Brian B. Phillips, Castle Rock, CO (US)

(73) Assignee: Danko Manufacturing LLC, Castle Rock, CO (US)

( * ) Notice: Subject to any disclaimer, the term of this patent is extended or adjusted under 35 U.S.C. 154(b) by 0 days.

(21) Appl. No.: 15/481,924

(22) Filed: Apr. 7, 2017

(65) Prior Publication Data

US 2018/0290635 A1    Oct. 11, 2018

(51) Int. Cl.

| | |
|---|---|
| *B60T 13/66* | (2006.01) |
| *B60T 13/74* | (2006.01) |
| *B60T 7/20* | (2006.01) |
| *B60T 7/04* | (2006.01) |
| *B60T 13/26* | (2006.01) |
| *B60T 17/22* | (2006.01) |

(52) U.S. Cl.
CPC ............... *B60T 7/20* (2013.01); *B60T 7/042* (2013.01); *B60T 13/265* (2013.01); *B60T 17/221* (2013.01)

(58) Field of Classification Search
CPC . B60T 7/06; B60T 7/20; B60T 13/746; B60T 13/08; B60T 11/107; B60T 11/108; B60T 17/22; B60T 17/221; B60T 17/223; B60T 13/66; B60T 13/74; Y10T 74/20
USPC .............. 303/20, 7, 119.3, 123, 15, 24.1, 3; 188/1.11 E, 112 R, 135, 3 H, 356
See application file for complete search history.

(56) References Cited

U.S. PATENT DOCUMENTS

| | | | | |
|---|---|---|---|---|
| 4,398,771 A | * | 8/1983 | McCurry | ................... B60T 7/20 188/3 R |
| 5,012,689 A | * | 5/1991 | Smith | .................... B60W 30/18 200/317 |
| 8,662,262 B1 | * | 3/2014 | Decker, Jr. | ................. B60T 7/20 188/112 R |
| 2002/0030405 A1 | * | 3/2002 | Harner | ...................... B60T 7/20 303/123 |
| 2004/0160117 A1 | * | 8/2004 | Brock | ....................... B60T 7/16 303/20 |

(Continued)

*Primary Examiner* — Robert A. Siconolfi
*Assistant Examiner* — San M Aung
(74) *Attorney, Agent, or Firm* — Gordon R. Lindeen, III; Hall Estill Attorneys at Law (57) ABSTRACT

Brake lock detection is described for a brake activation system. In one example, a main housing is configured to engage an interior surface of a towed vehicle near a brake pedal of the towed vehicle. An actuation arm extends away from the main housing configured to connect to the brake pedal to actuate a brake of the towed vehicle through the brake pedal. An arm drive system of the main housing applies a positive pressure to the actuation arm when activated to drive the brake pedal to actuate the brake. A negative pressure sensor generates a negative pressure signal when the brake pedal applies a negative pressure opposite the positive pressure to the actuation arm and the actuation arm is not activated.

20 Claims, 7 Drawing Sheets

(56) References Cited

U.S. PATENT DOCUMENTS

| | | | |
|---|---|---|---|
| 2004/0251094 A1* | 12/2004 | Cinquemani | B60T 7/04 188/110 |
| 2005/0093366 A1* | 5/2005 | Elstad | B60T 13/662 303/7 |
| 2007/0114836 A1* | 5/2007 | Kaminski | B60T 7/06 303/7 |

* cited by examiner

BRAKE LOCK DETECTION SYSTEM FOR TOWED VEHICLES

BACKGROUND

Field of the Invention

The present invention relates to assistance for towing vehicles and, in particular, to a structure and method for detecting when the brakes of a towed vehicle are locked by a brake activation system.

Related Art

It is often convenient to tow one vehicle behind another. While the towed vehicle can be carried on a separate trailer, the trailer adds additional weight to the combination. For braking, a heavy trailer typically provides a separate braking system that can be controlled by the tow vehicle through a standardized interface. The trailer's brakes can significantly reduce the stopping distance of the combination by aiding the tow vehicle in stopping the combination. Unlike a trailer, a typical towed vehicle, such as an automobile, a car, or a truck, does not have a trailer braking system interface. To reduce stopping distances, however, auxiliary braking systems have been developed to activate the towed vehicle's independent braking system.

Auxiliary braking controller systems come in many different configurations. Some systems connect to a trailer brake controller on the tow vehicle. The system then emulates the response that would be provided by a trailer. Others act independently of the towed vehicle using sensors to determine when the tow vehicle is slowing down. These sensors may be coupled to the hitch bar or coupled in another way to the two vehicles. Recently accelerometers connected with the towed vehicle have been used to determine when the towed vehicle is being slowed by the tow vehicle. There are also different ways to activate the towed vehicle's brake system. More complex systems electronically or hydraulically connect to the brake system to activate it or to boost pressure. A simpler system simply attaches to the towed vehicle's brake pedal and pushes the pedal to activate the brakes.

For use with recreational vehicles, portable auxiliary braking systems have been developed that can be placed on or in front of the driver's seat of the towed vehicle and then be attached to the brake pedal. Such systems may also require connections for power, control, and auxiliary safety systems. When the user has arrived at a parking destination, the portable system is removed from the towed vehicle so that the towed vehicle can be driven. When the user is ready to move to a new destination, the portable system is reinstalled. These same systems may also be used to tow vehicles using other vehicles in other contexts separate and apart from recreational vehicle use.

Since the braking system might be installed and removed several times a day in order to drive the towed vehicle, there is a constant risk that an operator may inadvertently install the system into the vehicle incorrectly. With a system that attaches to the brake pedal, there is a risk that the brake pedal will be pushed when it should not be pushed or that the system will lock the brakes and not release. In either event, the towed vehicle's brakes, tires, and other parts may be damaged or worn.

SUMMARY

Brake lock detection is described for a brake activation system. In one example, a main housing is configured to engage an interior surface of a towed vehicle near a brake pedal of the towed vehicle. An actuation arm extends away from the main housing configured to connect to the brake pedal to actuate a brake of the towed vehicle through the brake pedal. An arm drive system of the main housing applies a positive pressure to the actuation arm when activated to drive the brake pedal to actuate the brake. A negative pressure sensor generates a negative pressure signal when the brake pedal applies a negative pressure opposite the positive pressure to the actuation arm and the actuation arm is not activated.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

DETAILED DESCRIPTION

A portable, easy-to-use, auxiliary brake activation system provides great benefits in highway safety for those who tow another vehicle and for those on the roads around them. The more frequently it is used, the more likely it is to protect its users and others on the road. However, whenever something is attached to the brake pedal of a vehicle, there is a risk that an error will damage the vehicle. When the brake activation system is in a towed vehicle and the operator returns to a tow vehicle, then the error may go unnoticed. In some cases, operators have burned through a full set of brake pads on a towed vehicle in just a few miles without realizing that the brakes were applied. The brake lock detection system described below may not only detect installation faults but also warn the operator even when the operator is in the tow vehicle.

Figure 1:
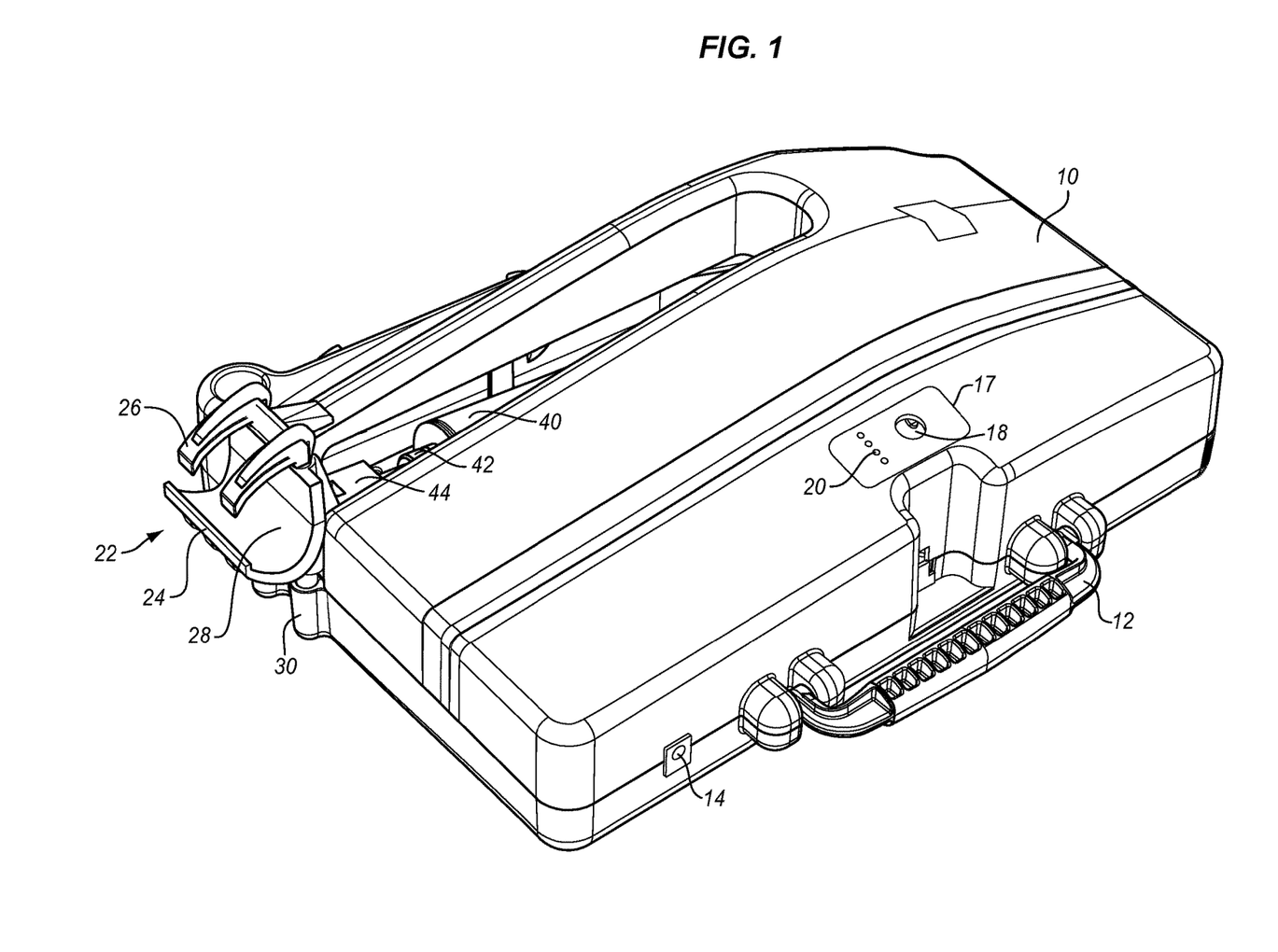
FIG. 1 is a front perspective view of a brake activation system according to embodiments of the present invention.

FIG. 1 shows a front perspective view of an example of a brake activation system according to one embodiment of the invention. The particular shape, size, and proportion may be modified to suit different applications, different vehicles and different tastes. In the illustrated embodiment, the system is configured to rest on the floor of a towed vehicle in front of the driver's seat, however, this is not required.

The system has a main housing 10 and a handle 12 to make it easy to carry and store. A safety socket 14 is provided for a connection to a tow bar. The safety socket receives a safety cable. In a typical example, the other end of the cable is attached to the tow vehicle. If the towed vehicle comes loose from the tow vehicle, then as the two vehicle moves away, the cable will be pulled from the safety socket. The brake activation system, upon sensing this, applies the brakes to stop the runaway towed vehicle. These functions and the safety socket may be removed or provided in many other ways.

The system also features a control panel 17 on an outer surface of the main housing. The control panel includes a start/stop button 18 and various status and control indicator lights 20. Additional buttons and indicators may also be used. The particular nature of the control panel may be modified for aesthetic or functional reasons. In one example, the control panel is a touch screen. In another example, physical switches may be used. A remote control panel screen may also or alternatively be used depending on the particular implementation. The system may also include a microphone or a speaker (not shown) to input commands or to receive confirmations and other signals.

At the front of the housing, a brake pedal connector 22 extends for convenient access by the user. The brake pedal connector has a base 24 and a movable grip 26 attached to the base. In this example, the base has a main wall 28 to push against a brake pedal in a location where a foot would typically push, and a lower cupped curve to curve around the bottom of the brake pedal. The grip, in this example, is in the form of a clevis, although other configurations may be used.

The forks of the clevis extend up and out from the base to reach over and around the top of the brake pedal. When attached to a brake pedal, the connector holds the brake pedal between the forks at the top and the cupped curve of the base on the bottom. Because both the clevis and the cupped curve are curved or pronged to wrap around the back of the brake pedal, the connector remains attached whether the connector is pulling or pushing on the brake pedal. In other words, the connector allows the brake activation system to apply pressure on the brake pedal in two directions both towards and away from the brake pedal, although this is not required.

The connector is held in the storage position shown in FIG. 1 by a pair of pins extending from the bottom of the connector that are placed into a corresponding pair of retainers 30 in the main housing. The pins are not visible in this view as they are concealed by the retainers.

An actuation arm 42 is attached to the brake pedal connector 22 and an arm drive system 40 is attached at one end to the actuation arm 31 and at the other end to the main housing 10. In the illustrated example, the actuation arm is a piston rod with a hinged connector 44 to the brake pedal connector base 24, although this is not required. The arm drive is a pneumatic cylinder 40. A piston attached to the piston rod and inside the cylinder is driven by an air compressor and valve control system (not shown) within the housing. The cylinder has a hinged track connector (not visible) within the main housing. The hinged connector of the brake pedal base allows the connector to change its position to accommodate different brake pedal angles. It also allows the brake pedal connector to move as the brake pedal is pressed. The hinged connection between the drive cylinder and the main housing allows the system to adapt to different brake pedal heights relative to the floor pan of the towed vehicle upon which the system rests while in use.

The brake activation system may also include a power socket (not shown) to supply power from the towed vehicle to drive the system. A power cord may be a cigarette lighter plug or 12V power plug to connect to an automotive 12V power socket or receptacle. The brake activation system may also have a structure to grip or engage a surface of the vehicle in order to be able to press against the brake pedal. In one example, a grooved rubber pad on the bottom of the system main housing may be used. In another example, the system may press against the driver's seat inside the passenger compartment. Alternatively, other gripping surfaces may be used, for example small hooks, such as those for hook and loop fasteners, or a fixed mounting fixture may be used. Some vehicles, for example, have hooks or slots for attaching removable carpet or rubber mats. These, or a specific purpose-built connector, may be used to secure the housing into the floor pan of the towed vehicle.

Figure 2:
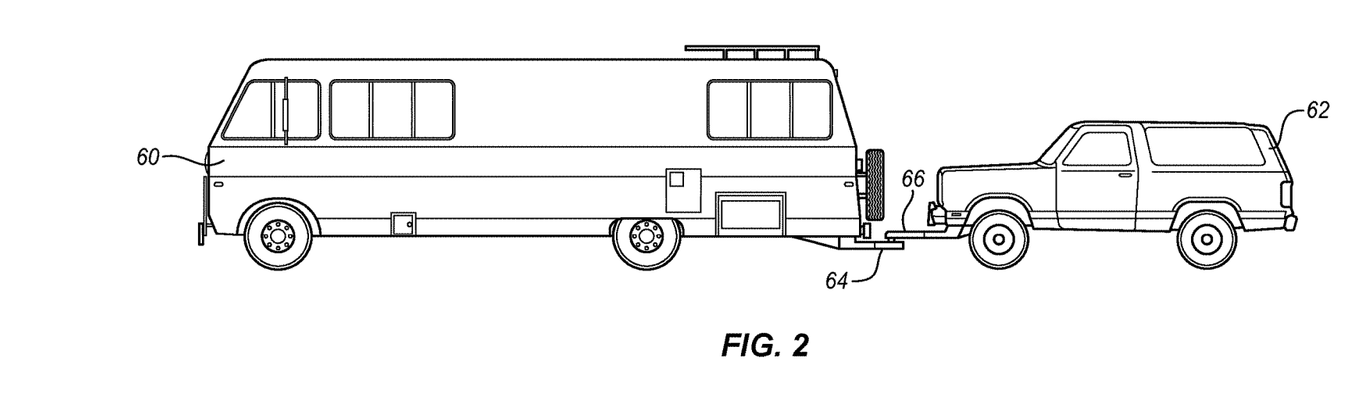
FIG. 2 is diagram of a tow vehicle and a towed vehicle suitable for use with embodiments of the present invention.

FIG. 2 is a diagram of a typical context in which a brake activation system such as that of FIG. 1 may be used. A tow vehicle 60 pulls a towed vehicle 62. In the illustration, the tow vehicle is a motor home and the towed vehicle is a light reconnaissance vehicle. However, the tow vehicle may be any type of car, truck, van, bus, or recreational vehicle and the towed vehicle may be any lighter vehicle with a conventional brake pedal activated system. The tow vehicle has a tow hitch 64 and the towed vehicle has a tow bar 66. The tow bar attaches to the hitch for towing. When the towed vehicle is unhitched for separate use, the tow bar is removed or folded out of the way.

Figure 3:
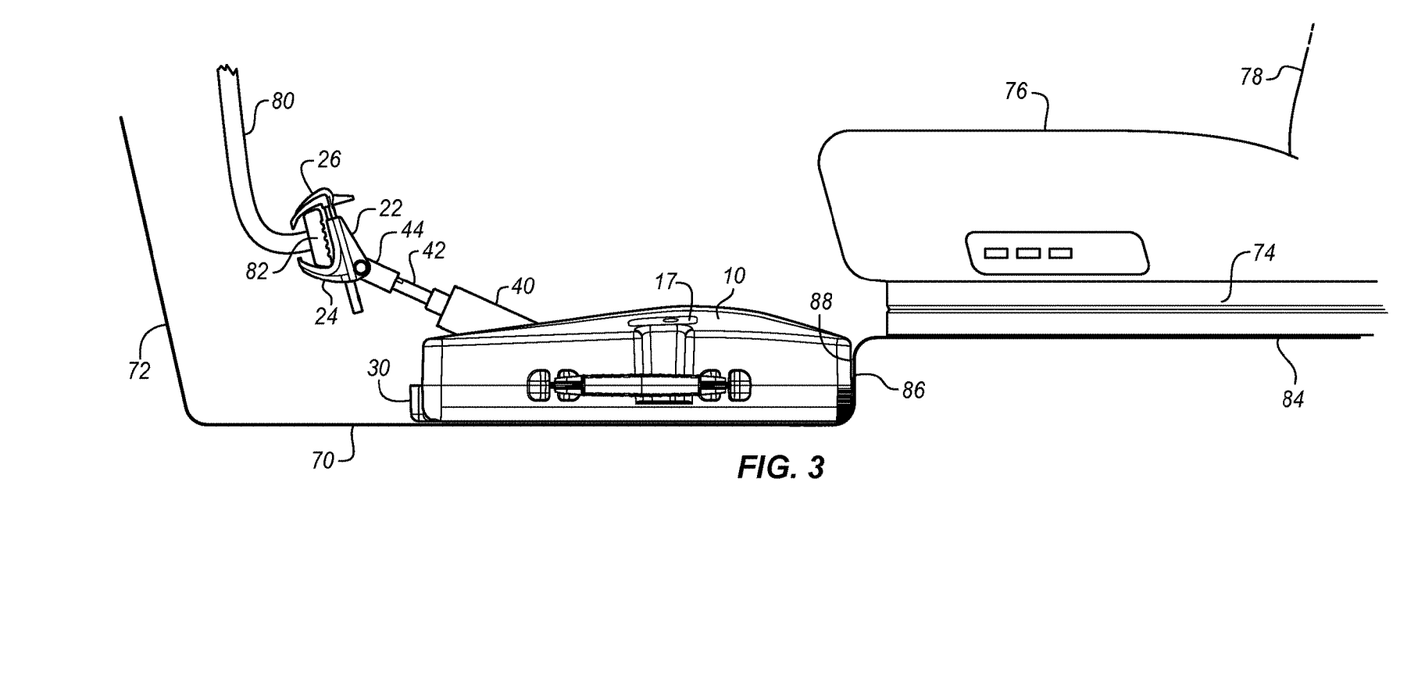
FIG. 3 is a side view of the system of FIG. 1 installed inside a towed vehicle according to embodiments of the present invention.

FIG. 3 is a diagram of an example of an interior driver's area of a towed vehicle. In FIG. 3, the towed vehicle interior has a floor pan 70 which is typically, but not necessarily carpeted. The floor pan extends forwards to a firewall 72, between the interior and the engine compartment. It extends rearwards to a seat platform 84. The seat platform carries a seat rail 74 which supports the driver's seat 76 and seat back 78.

The floor pan has a ridge, or wall 86 at the edge of the seat platform. A back surface 88 of the brake activation system 10 is placed against this ridge. This helps to prevent the system 10 from moving backwards when the system presses against the brake pedal. Some vehicles have a flat floor pan in which the seat platform is not raised. In this case the back surface of the system 10 may rest against the driver's seat 76 or supporting seat rail 74. Alternatively, the system can rest on the floor pan without the back surface being braced against any surface or on the seat of the vehicle.

The vehicle interior also has a brake pedal 82 suspended from a brake pedal arm 80 used to activate vehicle's independent braking system. The brake pedal is typically coupled though the brake pedal arm to a hydraulic reservoir so that when the brake pedal is pressed brake fluid is pushed out of the reservoir to drive brake pads against rotors or drums to slow or stop the wheels. However, the invention is not limited to any particular configuration or operation of the vehicle's braking system.

In FIG. 3, the connector 22 is shown attached to the brake pedal 82. The base 24 curves around the back of the brake pedal and the upper grip 26 reaches around and over the top of the brake pedal. Both portions allow the brake pedal to be grasped from behind and also to be pushed from in front. In one example, the grip is pressed towards the base against the brake pedal and is then locked in place. In another example, a spring (not shown) drives the grip towards the brace. To attach the connector, the user pushes the grip away from the base, moves the base around the back of the brake pedal and then releases the grip. The spring drives the grip toward the base to apply pressure on the top and bottom of the brake pedal and hold the connector in place.

The actuation arm 42 is coupled to the connector with a pivoting connector to allow the connector to conform to the angular position of the brake pedal. Since a brake pedal is typically mounted on a pivoting arm 80 with a pivot point (not shown) well above the floor pan, and the brake connector is mounted to an actuation arm with a pivot point on the brake activation system, as the brake pedal is pressed, it will rotate differently from the rotation of the brake connector. The pivoting connection 44 between the brake pedal connector and the actuation arm allows the connector to move as the angular position of the brake pedal changes. The pivoting connection (not visible) between the drive cylinder 40 and the main housing 10 allows the brake pedal connector to move up and down as the brake pedal is depressed. It also allows the system to be used with brake pedals at different distances and heights from the floor pan.

Figure 4:
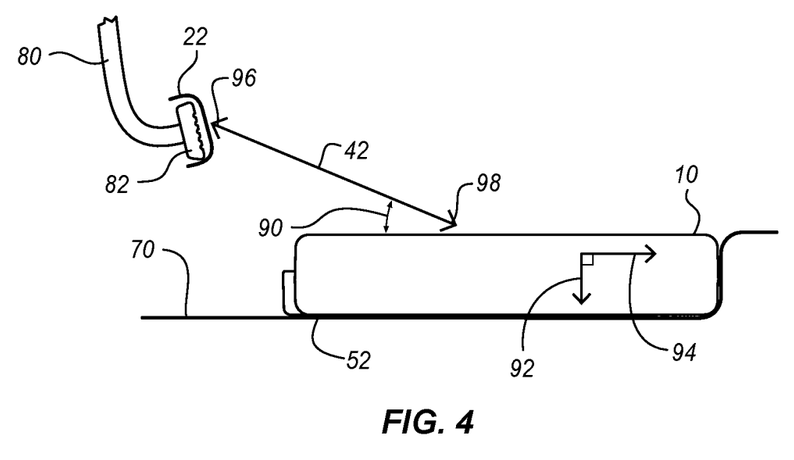
FIG. 4 is a diagram of forces and angels that may be present in the installation of FIG. 3 according to embodiments of the present invention.

FIG. 4 is a diagram of the vehicle interior of FIG. 3 to show the forces that are active when the brake pedal is pressed by the arm drive system. When the brake activation system pushes the vehicle brake pedal, the pneumatic cylinder 40 drives the actuation arm 42 away from the main housing 10 and toward the brake pedal 82 as shown by the arrow 96 of FIG. 11. The pushing is at an angle 90 between the main housing and the arm drive system that can vary with different vehicles.

The resistance of the brake pedal creates an equal and opposite force in the opposite direction as shown by the arrow 98. This force has two components, the horizontal and rearward component 94 drives the main housing against the seat platform 84 or against the driver's seat 76. This force is parallel to the flat portion of the vehicle floor pan and parallel to the bottom surface 52 of the main housing. If the bottom surface has ridges, or hooks, then these will resist movement of the system away from the brake pedal. If the back surface of the system is resting against a ridge in the floor pan for the seat platform, then this ridge will prevent the system from moving away from the brake pedal. The opposite force also has a vertical and downward component in a direction normal to the bottom surface of the system. This component of the force will hold the main housing in place by pressing the bottom surface directly into the floor pan of the vehicle.

Figure 5:
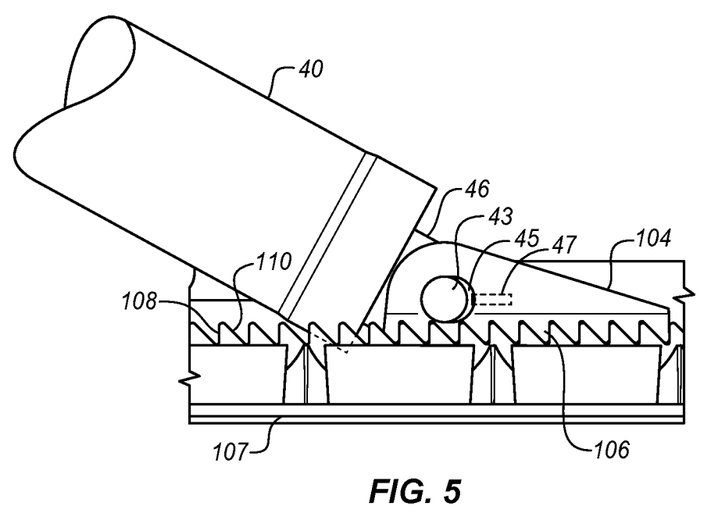
FIG. 5 is a side view of a cylinder anchor plate, ratchet track, and brake lock detector of the system of FIG. 1 according to embodiments of the present invention.

The actuation arm extends outwards from the main housing in order to push on the brake pedal and actuate the brake system of the towed vehicle. As a result, pressing on the brake pedal drives the actuation arm against the brake pedal and against the main housing. When the actuation arm is not pressing on the brake pedal, then this pressure on the main housing should be relieved. However, if the braking system is not installed properly, it can happen that the actuation arm is pressing against the brake pedal even when the actuation arm is not actuated. In this case, the actuation arm does not withdraw to release the brake pedal. As a result, the towed vehicle's brakes may be engaged during normal towing. This puts wear on the towed vehicle's brakes and on the towing vehicle's drivetrain. Such a brake lock condition may occur when the actuation arm is positioned to close FIG. 5 shows an opposite end of the actuation arm. The base of the pneumatic cylinder 40 is attached to an anchor 104. The anchor is attached through a pivot pin 43 which allows the pneumatic cylinder to rotate at the hinged connection 46 to the anchor. This rotation allows the actuation arm to adapt to different brake pedal positions and allows for the connector to be lifted up away from the main housing for use, or lowered into the main housing for storage. FIG. 1 shows the brake connector arm and arm drive in the lowered storage position, while FIG. 3 shows the arm and arm drive in the raised, installed position with the brake connector connected to a brake pedal.

The anchor has a ratcheted toothed base plate 106 on its bottom surface. The base plate engages a ratcheted toothed rail 108 attached to the main housing 10. In one example the ratchet rail 108 is attached to the bottom plate of the housing for strength and to lower the position of the anchor relative to a brake pedal. The teeth of the rail and of the anchor are angled to allow for ratcheting. One side 108 of each tooth facing the direction of a brake pedal is vertical or nearly vertical. It may also be sloped toward the brake pedal. The other side 110 of each tooth is gently sloped, for example, at about 45 degrees from the vertical. The anchor has an interlocking inverse configuration to engage the rail at any position on the rail. While a toothed rail and plate are shown, any of a variety of other ratcheting, locking, or sliding mechanisms may be used instead, depending on the particular implementation.

As a result, the anchor plate can ride over the sloped sides 110 of each tooth toward the brake pedal, but cannot ride over the teeth away from the brake pedal. This allows the position of the anchor plate to be moved by pulling the arm drive 40 toward the brake pedal. When the arm drive has reached its position, it is locked into place. When the arm drive pushes the brake pedal, the anchor's bottom plate 106 will engage the ratchet rail to lock the arm drive in place. As long as the brake activation system housing remains in place the arm drive will effectively push against the brake pedal. To move the arm drive away from the brake pedal, it may be lifted so that the anchor clears the ratchet rail and then placed back onto the ratchet rail in the desired position, for example for storage. This configuration and any other type of sliding mechanism also allows the arm drive to be moved toward the brake pedal to reach the brake pedal and be attached to the brake pedal. However, if the arm drive is moved too close to the brake pedal, then the cylinder 40 will not be able to draw in the brake connector to release the brake.

The anchor has a hole 45 on either side of the arm 40 to hold the pin 44 that attaches the arm to the anchor. Each hole is elongated horizontally rather than being round to match the pin. The elongation allows the pin 44 to move a small amount towards and away from the brake pedal. In the FIG. 5 example, if the arm and therefore the pin is pulled toward the brake pedal there is a gap through the oblong part of the hole opposite the brake pedal. If the arm is being positively pushed to apply a positive pressure against the brake pedal, then the brake pedal will move some distance but will also deliver an opposite negative pressure against the pin. The negative pressure pushes the pin back to the part of the hole that is opposite the brake pedal. A brake sensor 47 determines the position of the pin as either at the back of the hole or the front of the hole. It may also detect an amount of negative pressure of the pin against the back of the hole. A variety of different sensors may be used as described below.

The brake sensor 47 allows the system to determine whether there is pressure against the brake pedal. This can be compared to the operating condition of the system. If the system is actuating the arm to press the brake and there is pressure against the brake pedal, then the system is operating properly. If the system is not actuating the arm to press the brake pedal and there is no pressure against the brake pedal, then the system is operating properly. On the other hand if the system is actuating the arm to press the brake and there is no pressure or if the system is not actuating the arm and there is pressure, then there is a fault. The system can sound an alarm, alert a user, or provide another response.

Figure 6:
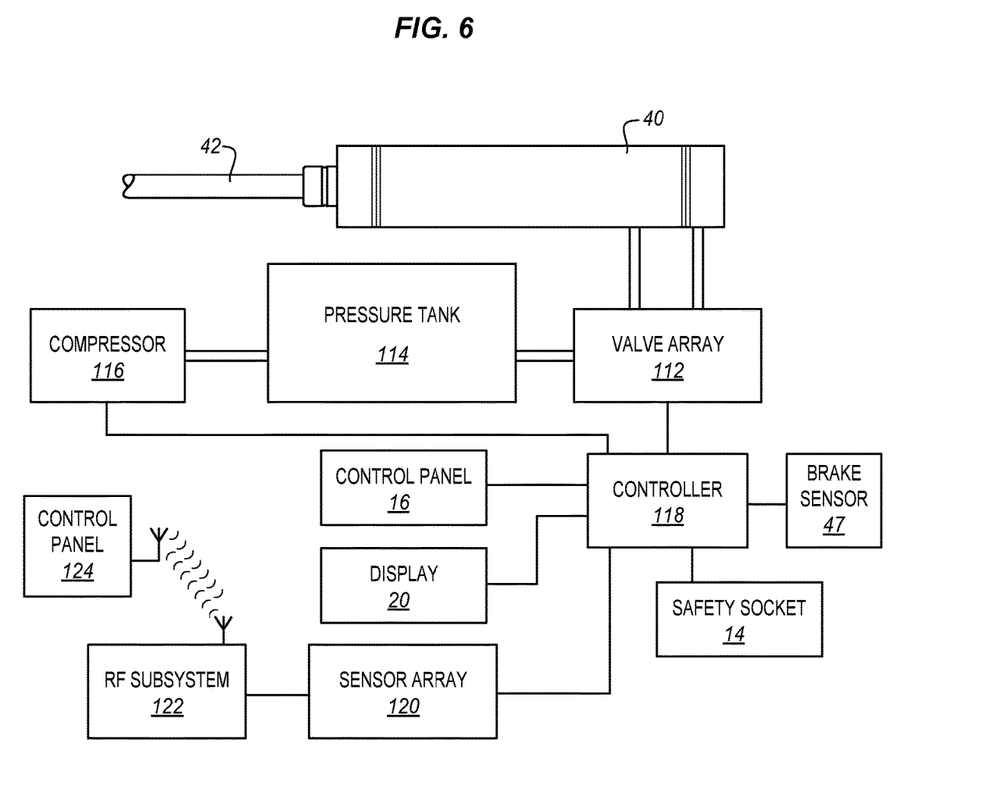
FIG. 6 is a block diagram of hidden components of the system of FIG. 1 system according to embodiments of the present invention.

FIG. 6 is a block diagram of the internal operating components of the brake activation system of FIG. 1. The actuation arm or piston rod 42 is coupled to the arm drive or pneumatic cylinder 40 to press the brake pedal as described above. The pneumatic cylinder is controlled by a valve array 112 which is supplied by a pressure tank 114. Using the valve array, pressure from the tank can be supplied to the cylinder to move the piston in either direction. This drives the activation arm either toward or away from the brake pedal. The pressure tank is fed by a compressor 116. While the present invention is described as pneumatic, a hydraulic system, gear drive, cable drive, stepping motor or other system may be used instead.

The entire system is controlled by a controller 118, typically in the form of a programmed microprocessor or microcontroller with embedded or discrete program instructions and operational memory. The controller is coupled to at least the compressor 116 and the valve array 112 to control the operation of the actuation arm. The control is coupled to the control panel 16 to receive commands and to the display 20 to indicate status and operation conditions. The controller is also coupled to the safety socket 14 to drive the actuation arm toward the brake pedal when the safety socket connection is lost.

The controller may also be coupled to a sensor array 120. The sensor array contains two types of sensors. A first type of sensor determines the operational conditions of the brake activation system. For example, sensors may measure the pressure in the pressure tank, the condition of the compressor, the positions of the valves and the position of the piston arm 42. A separate brake sensor 47 detects whether there is pressure applied against the brake pedal as described above. This information may be used to ensure that the system operates as intended.

To operate the pneumatic cylinder 40, there is at least a valve in the valve array 112 that releases air from the pressure tank into the cylinder to drive the piston against the brake. There may be another valve to release air from the pressure tank or from the cylinder into the opposite side of the cylinder to drive the piston away from the brake. One or more pressure sensors in the cylinder may be used to determine whether the cylinder is energized and in which direction.

A second type of sensor determines whether the towed vehicle should be braked and, if so, then how firmly. In one example, the sensor receives commands from a trailer wiring system of the tow vehicle. In another example, the sensor array includes accelerometers, pitch sensors, pressure sensors, or other sensors to determine whether the towing vehicle is braking. When the sensors determine that the towing vehicle is braking, then the controller can activate the brakes of the towed vehicle to assist. The amount of braking or the firmness of the braking can also be determined using the accelerometers. In this way, if the towing vehicle is braking firmly, then the towed vehicle's brakes will be operated firmly. On the other hand if the towing vehicle is braking gently then the towed vehicle's brakes may also be operated gently.

The interaction of the controller and the brake sensor or brake lock detector may be described in a table. The table shows two different operational states for the braking system. The braking status may be rest or brake. These two states are driven and controlled by the controller 118. The controller may include on-board memory to store machine-readable instructions, operating parameters, status, and alerts to perform the operations described herein, among others. Alternatively, a separate memory coupled to the controller may be used. The rest state is for normal towing and the brake state is when the braking system activates the towed vehicle's brakes to assist with stopping. Similarly the brake sensor has two states, No brake and brake.

When the operational state and the sensor state do not match, then there is a fault. Two fault states are indicated in the Table, but there may be more. The type of fault may be used to indicate a proper course of action to the operator. If the fault is that the brakes are locked on, then the alert is urgent. If the controller receives the negative pressure signal from the sensor when the braking status is at rest, then in response to this fault, the controller may prevent activation of the actuation arm. It may even seek to withdraw the arm, i.e. pull the arm toward the main housing away from the brake pedal. The system may also shut off any brake actuation in order to reduce the pressure on the brake pedal and total wear. When the fault is that the towed vehicle's brakes are not being actuated, then the alert is less urgent because the towing vehicle is still able to stop both vehicles. However, the towed vehicle braking system is ineffective to assist with braking.

TABLE

| Braking Status | Sensor Status | Alert | Action |
| --- | --- | --- | --- |
| Rest | No brake | Good | n/a |
| Rest | Brake | Fault 1 (Urgent) | Send Alert 1 System OFF |
| Brake | No Brake | Fault 2 | Send Alert 2 |
| Brake | Brake | Good | n/a |

The brake activation system may also include a radio frequency (RF) or remote communications subsystem 122. This subsystem is shown as being connected to the sensor array 120 but may alternatively be coupled directly to the controller or to any other part of the system. This system may use any of a variety of wireless or wired standards for communication with remotely located devices. In one example, the RF subsystem receives commands and sends status messages to a control panel 124 in the tow vehicle that the tow vehicle driver can see and operate. The two-way connection may be used for a variety of different purposes and may be portable so that it may also be used in the towed vehicle for set up, diagnosis, and operation. In particular, if the brake sensor or any other sensor detects a fault, then RF subsystem may send an alert to the remote control panel 124 in the tow vehicle and also activate any other alarms or alerts, such as on the housing control panel 16 or using audible warnings.

The RF subsystem may also communicate with additional sensors at the hitch or in the tow vehicle to obtain additional brake activation information. The RF subsystem may also contain receivers for position information, and transmitters to send an alert if the towed vehicle is lost or stolen.

The system of FIG. 6 is provided as an example only. It may be modified in many different ways to suit different applications. More or fewer components may be used depending upon cost and accuracy constraints. In addition, additional components may be added to provide additional functions other than activating the braking system. While a pneumatic arm drive is shown, any other type of drive may be used, such as a solenoid, an electromagnetic drive, a stepping motor, etc.

Figure 7:
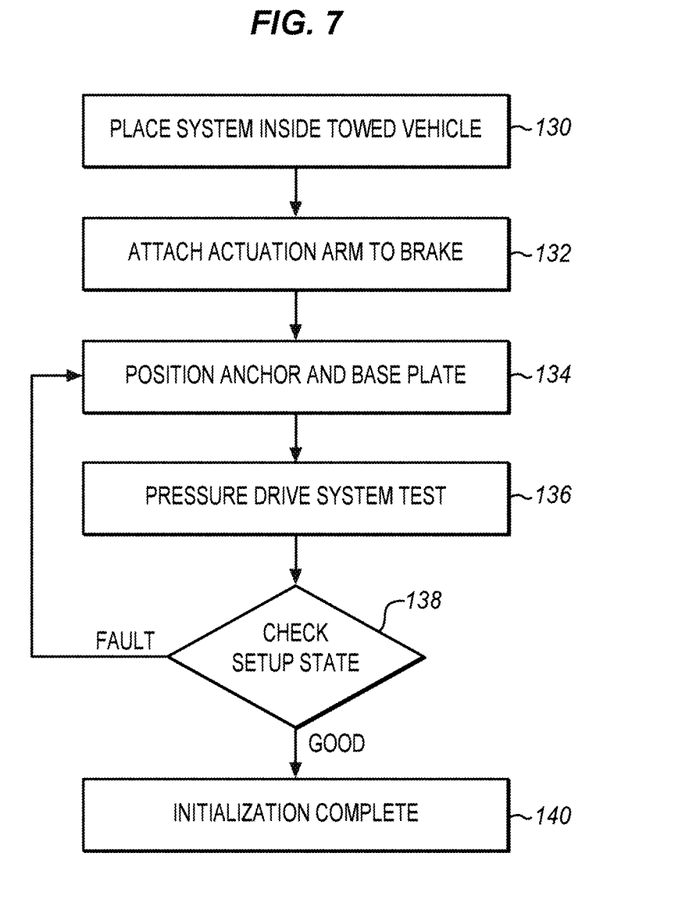
FIG. 7 is a process flow diagram of initializing the system of FIG. 1 according to embodiments of the present invention.

FIG. 7 shows a process for installing the brake activation system into a towed vehicle and initializing the system using the movable anchor plate shown in FIG. 5. At block 130, the brake activation system is placed inside the towed vehicle in a position such as that shown in FIG. 3 or in some other position depending on the configuration of the braking system. At the same time the user can make any other appropriate connections. In the described example, the safety cable is attached into the safety socket and the power plug is pulled out of its holder and plugged into a 12V receptacle to power the system.

At block 130, the brake pedal connector is attached to the towed vehicle's brake pedal so that the actuation arm and its drive system are connected to the vehicle brake system. The actuation arm or piston rod is pulled out of the cylinder to pull the brake pedal connector away from the main housing and toward the brake pedal. Upon reaching the brake pedal, the connector is attached to the brake pedal.

After attaching the brake pedal connector and any other ancillary equipment, at block 134 the braking system housing is positioned properly in the towed vehicle and the anchor is positioned with respect to the housing. The correct positions may vary based on the distance to the brake pedal and the size of the brake pedal travel. In some systems, this process is performed by the system automatically for example by pulling and pushing on the brake pedal to move the anchor to a correct position on the track.

At 136, the system is activated, initialized and tested. The initialization routine may include various sensor calibrations, and power tests, as well as radio and electrical equipment startup. For the pneumatic system described above, the pressure tank will also be pressurized and the pneumatic cylinder may be initialized. The actuation arm drive system is activated to drive the arm and the brake pedal connector toward and away from the brake pedal. The movement of the actuation arm with respect to the brake pedal should provoke a response from the brake sensor 47. So that the sensor detects negative brake pedal pressure when the arm is pressing on the brake and no pressure when the arm is not pressing on the brake.

At block 138 the results of this and any other tests may be evaluated to determine whether the braking system is operating properly and if it is installed correctly in the vehicle. The state of the system can be checked using any available sensors. If the arm drive is in place and there is measured resistance against the brake pedal only when appropriate as indicated e.g. in the Table, then the system can indicate the initialization is complete and be ready for the tow vehicle to be underway. On the other hand, if the system initialization is not complete, then there is a fault and the process may return to block 136 to repeat the operations of positioning the anchor plate and the housing. A variety of different alerts may be provided, depending on the likely fault or to guide the operator through a process of eliminating likely faults.

If the system checks are all good, then at 140, the installation and initialization is complete. The vehicle is ready for brake activation when being towed.

A variety of different types of brake sensors may be used in a variety of different locations. The sensor may be on the track or on the anchor to detect pressure by the anchor against the track. A similar sensor to that of FIG. 5 may be mounted instead at the opposite end of the arm where the brake pedal connector 22 attaches to the actuation arm, either on the actuation arm or on the brake pedal connector. Alternatively, the pneumatic or hydraulic pressure may be sensed in the tank or in the cylinder to determine whether there is pressure in the actuation arm or in some other part of the system, when the actuation arm is not pressing against the brake pedal. Suitable locations for the brake lock detection sensor will depend on the nature of the actuation arm and its connection to the brake pedal and the main housing. The sensor may be mechanical, optical, or electrical.

Figure 8:
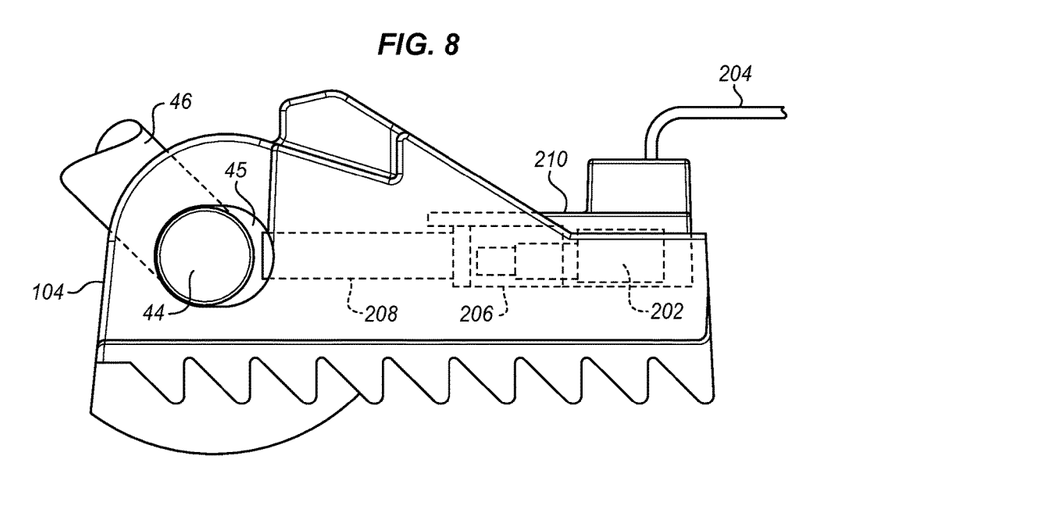
FIG. 8 is a cross-section side view diagram of an anchor plate with a brake lock detector according to embodiments of the present invention.

FIG. 8 is a diagram of a particular implementation of a brake sensor suitable for use with a variety of different types of actuation arms. This switch is suitable for any system in which an arm from the brake pedal connects to a base. Such a switch may also be adapted for use at the position where the arm attaches to the brake pedal connector.

FIG. 8 is a cross-sectional side view diagram of an example implementation of a brake lock switch. A switch 202 is mounted to the anchor 104 with an electrical wired connection 204 to the controller. The connection may be direct as in FIG. 6 or indirect through another component. In this example, the switch is a simple mechanical electrical push button. When the switch is pressed it makes an electrical contact to close a loop through the wires 204 that is then detected by the controller. However, any other type of switch may be used.

A switch slide 206 has one end near the switch 202 to press against the switch. At the other end of the slide there are legs 208 that extend into the elongated holes 45 that hold the pin 44 that attaches the actuation arm 40 to the anchor 104. When the pin moves within the anchor hole it presses against the legs pushing the slide away from the actuation arm. This movement of the legs pushes the slide against the switch, closing the switch. A cap 210 or cover holds the parts in place in the anchor. In some embodiments, the switch is spring loaded into the open position. This spring pushes the legs into the anchor hole. In other embodiments, other springs or other biasing devices may be used.

Figure 9:
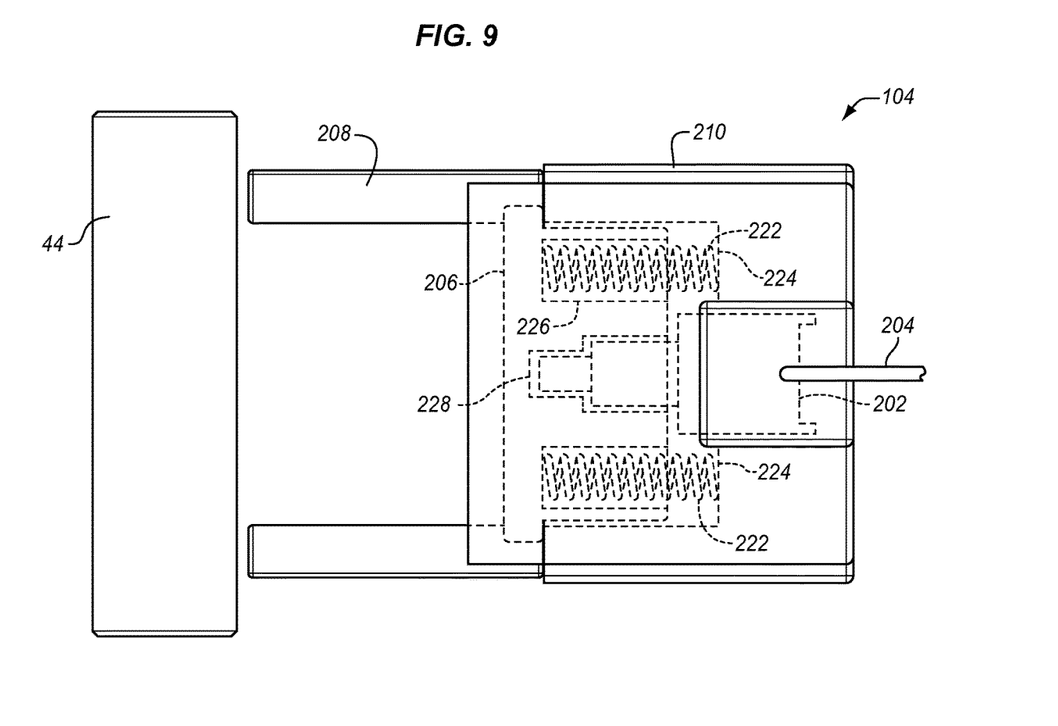
FIG. 9 is a top view diagram of components of the brake lock detector of FIG. 8 according to embodiments of the present invention.

FIG. 9 is a top view diagram of some of the components shown in FIG. 8. In this diagram the actuation arm pin 44 is carried in the anchor 104 near the legs 208 of the slide 206. A set of springs 222, one for each leg 208, between the slide 206 and a back wall 224 of the cap 210 presses the legs into the anchor holes and toward the pin. While coil springs are shown, any sort of biasing device may be used. When these springs are overcome by the negative pressure of the brake pedal against the actuation arm and therefore against the pin, then the slide is pressed closer toward the internal back wall of the cap, although any other surface may be used.

The springs 222 are carried inside chambers 226 of the slide that engage the walls of the chambers and the internal back wall 224 of the cap. When the springs are overcome by the negative pressure of the pin 44 then a switch surface 228 of the slide presses the switch. When the switch is closed, the continuity is detected by the controller. As described above, the controller compares the switch state to the actuation arm state and, if the actuation arm is at rest, then it generates a fault signal and an alert to the operator through any of a variety of different means, including an internal and possible external control panel.

The spring rate may be used to control the amount of negative pressure required to activate the switch. The spring rates may be adapted to suit the pressure applied by the brake pedal and by the actuation arm. While the slide is shown as having a pair of pins and a main body, it may take other shapes and configurations. Some parts may be in other components and some parts may be consolidated or formed into more discrete components. In another embodiment two different pairs of springs may be used or different type so springs or biasing devices in other locations may be used.

Figure 10:
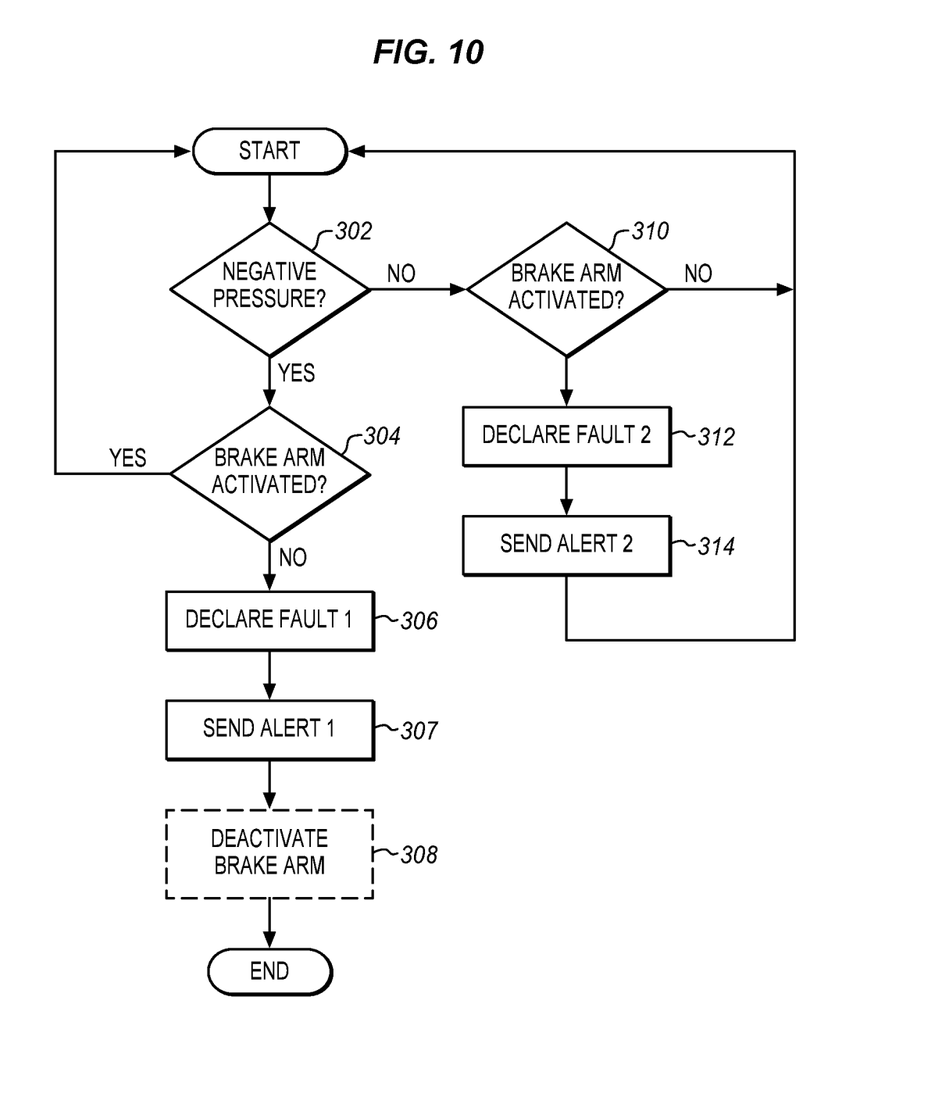
FIG. 10 is a process flow diagram of using a brake lock detection system in a brake activation system according to embodiments of the present invention.

FIG. 10 is a process flow diagram of using a brake lock detection system in a brake activation system. The system starts after being configured and installed by determining the state of the negative pressure sensor at 302. This is also referred to as the brake lock detection sensor or switch. For the simple switch and spring system described above, it is easy to determine whether a negative pressure is applied from the brake pedal of the towed vehicle upon the actuation arm connected to the brake pedal that extending from the main housing in the interior of the towed vehicle to the brake pedal. This may be done be determining whether the switch is closed. Other types of sensors allow this determination to be made in other ways, If negative pressure is being applied to the actuation arm at 302, then the process determines at 304 whether the actuation arm activated so that it is being driven from the main housing against the brake pedal to apply a positive pressure to actuate the brake of the towed vehicle. If the arm is not activated but there is negative pressure then something is wrong and a fault is declared at 307. The brake is applied but the brake activation system is not intending to apply the brakes. The brakes are most likely locked in the applied position by an error is installing the brake actuation system. This corresponds to Fault 1 in the table. There may also be a fault in the operation of the actuation system.

At 307 an alert is sent in response to declaring the fault. The alert may be an audible warning from the main housing, flashing lights from the main housing, a particular screen display, or some other alert. In addition alerts may be sent to other devices. As shown in FIG. 6, the main housing may have a wireless connection directly or indirectly to another device that may serve as a display or a control panel 124. An alert may be sent to such a remote device in addition to or instead of the alert to the main housing. This is particularly useful if the additional display is in the towing vehicle so that the driver knows not to tow the towed vehicle with its brakes actuated. The alert may provide particular information about the detected problem and about an appropriate action for an operator to take.

At 308 additional actions may be taken in response to the declared fault. The system may deactivate the brake arm. For a pneumatic or hydraulic system, this may amount to releasing any pressure in the driving cylinder. For this or any other type of system, including an electric motor-driven system, the actuation arm may be driven in the negative direction in order to draw the arm toward the main housing and away from the brake pedal. This would apply a negative pressure to the brake pedal in response to declaring the fault. This may reduce or release the positive pressure against the brake or it may have no effect depending on the nature of the fault and whether the brake actuation system has been installed improperly.

The alert should induce the operator of the tow vehicle to stop and correct the problem by adjusting the brake actuation system, removing it, or repairing it.

If negative pressure is detected at 302 but the brake arm is activated to create that negative pressure at 304, then the system is operating properly. This corresponds to a good alert in the table. The system may send a good alert to a control panel or display indicating proper operation or the system may simple return to normal operation without any indication. The controller may also store a status log that includes faults and status messages including this good result.

If there is no negative pressure detected at 302, then there are again two possibilities. If there brake arm is not activated at 310, then the system is working normally. This is another good alert and a message may be sent or a log entry made and the system returns to the start.

On the other hand, if there is no negative pressure at 302 and the brake arm is activated at 310, then the system is trying to apply the brakes but for some reason the brakes are not being applied. This will cause longer stopping distances and the driver of the tow vehicle should be alerted. This may be a fault in the towed vehicle, the brake actuation system, or in the installation of the brake actuation system. A fault is declared, referred to as fault 2, at 312 and an alert is sent at 314. The alert may take any of the above forms such as audible and visual warnings. There may also be warnings sent through the wireless link as for the fault 1 alert. The operator upon receiving the warning may then check the installation and operation of the brake actuation system to address the fault.

A lesser or more equipped brake activation system and brake lock detector than the examples described above may be desirable for certain implementations. Therefore, the configuration of the system will vary from implementation to implementation depending upon numerous factors, such as price constraints, performance requirements, technological improvements, and/or other circumstances.

While the steps described herein may be performed under the control of a programmed processor, such as central processing unit, a microcontroller or by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a specific combination of hardware components.

The present description presents the examples using particular terms, such as towed vehicle, brake pedal, actuation arm, arm drive, sensor, switch, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

The present invention includes various steps, which can be performed by hardware components or can be embodied in machine-executable instructions, such as software or firmware instructions. The machine-executable instructions can be used to cause a general-purpose or special-purpose processor programmed with the instructions to perform the steps. The machine-executable instructions may be stored in a controller or in a separate memory. Alternatively, the steps can be performed by a combination of hardware and software.

Aspects of the present invention can be provided as a computer program product that can include a machine-readable medium having stored instructions thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A brake controller comprising:
   a main housing configured to engage an interior surface of a towed vehicle near a brake pedal of the towed vehicle;
   an actuation arm extending away from the main housing configured to connect to the brake pedal to actuate a brake of the towed vehicle through the brake pedal;
   an arm drive system of the main housing to apply a positive pressure to the actuation arm when activated to drive the brake pedal to actuate the brake;
   a negative pressure sensor to generate a negative pressure signal when the brake pedal applies a negative pressure to the actuation arm and the actuation arm is not activated.

2. The brake controller of claim 1, further comprising a controller to receive the negative pressure signal and to prevent activation of the actuation arm in response to receiving the negative pressure signal.

3. The brake controller of claim 2, wherein the controller is coupled to activate the actuation arm to receive the negative pressure signal and to prevent actuation of the actuation arm when receiving the negative pressure signal.

4. The brake controller of claim 1, wherein the negative pressure sensor comprises a mechanical switch.

5. The brake controller of claim 1, further comprising an anchor plate mounted to the actuation arm opposite the brake pedal and a track mounted to the main housing so that positive pressure of the actuation arm pushes the anchor plate against the track.

6. The brake controller of claim 5, wherein the negative pressure sensor is a mechanical switch attached to the anchor plate so that the switch is activated by pressure of the anchor plate against the track.

7. The brake controller of claim 1, further comprising a pin to attach the actuation arm to the anchor plate, the brake controller further comprising a slide configured in the anchor plate to be pushed by the pin when the brake pedal applies negative pressure and wherein the slide activates the negative pressure sensor.

8. The brake controller of claim 7, further comprising a first biasing means to bias the slide toward the pin.

9. The brake controller of claim 8, wherein the first biasing means has a first spring rate, the brake controller further comprising a second biasing means having a second spring rate to bias the slide away from the switch, the slide being configured so that the negative pressure is greater than the first biasing means and greater than the second biasing means to activate the negative pressure sensor.

10. The brake controller of claim 8, wherein the anchor plate has an elongated hole to carry the pin, wherein the pin moves in the elongated hole to push the slide.

11. The brake controller of claim 1, further comprising a controller to receive the negative pressure signal and to activate a fault alert in response to receiving the negative pressure signal.

12. The brake controller of claim 11, wherein the controller is to activate the fault alert only if the controller is not activating the actuation arm.

13. A brake controller comprising:
    means for engaging an interior surface of a towed vehicle near a brake pedal of the towed vehicle;
    means for actuating a brake pedal of the towed vehicle, the means extending away from the means for engaging and configured to connect to the brake pedal;
    means for driving the means for actuating by applying a positive pressure to the means for actuating to drive the brake pedal to actuate a brake of the towed vehicle;
    means for sensing a negative pressure to generate a negative pressure signal when the brake pedal applies a negative pressure to the means for actuating.

14. The brake controller of claim 13, further comprising a controller for receiving the negative pressure signal and to prevent activation of the means for actuating in response to receiving the negative pressure signal if the means for driving is not applying a positive pressure.

15. The brake controller of claim 14, wherein the controller is further for sending a fault signal in response to receiving the negative pressure signal when the controller is not activating the means for actuating.

16. The brake controller of claim 15, wherein the controller is further for sending the fault signal to a remote display.

17. A method comprising:
    determining whether a negative pressure is applied from a brake pedal of a towed vehicle upon an actuation arm connected to the brake pedal and extending from a main housing in an interior of the towed vehicle to the brake pedal;
    determining whether the actuation arm is being driven from the main housing against the brake pedal to apply a positive pressure to actuate a brake of the towed vehicle;
    if a negative pressure is applied from the brake pedal without a positive pressure from the main housing, then declaring a fault; and
    sending an alert in response to declaring the fault.

18. The method of claim 17, wherein sending the alert comprises sending the alert to a remote display through a wireless link.

19. The method of claim 17, further comprising preventing driving of the actuation arm from the main housing in response to declaring the fault.

20. The method of claim 17, further comprising driving the actuation arm toward the main housing away from the brake pedal to apply a negative pressure to the brake pedal in response to declaring the fault.

* * * * *